United States Patent [19]

Pearson et al.

[11] 3,794,970

[45] Feb. 26, 1974

[54] STORAGE ACCESS APPARATUS

[75] Inventors: Kenneth A. Pearson, Kingston; Gordon M. Zook, Germantown, both of N.Y.

[73] Assignee: International Business Machines Corporation, Armonk, N.Y.

[22] Filed: Nov. 24, 1972

[21] Appl. No.: 309,387

[52] U.S. Cl. .......... 340/172.5
[51] Int. Cl. ...... G06f 7/00, G06f 15/00, G11c 7/00
[58] Field of Search .......... 340/172.5

[56] References Cited

UNITED STATES PATENTS

| | | | |
|---|---|---|---|
| 3,477,064 | 11/1969 | Hilgendorf et al. | 340/172.5 |
| 3,551,898 | 12/1970 | Prieto | 340/172.5 |
| 3,553,653 | 1/1971 | Krock | 340/172.5 |
| 3,562,719 | 2/1971 | Hynes et al. | 340/172.5 |
| 3,716,838 | 2/1973 | Lemessurierbeard | 340/172.5 |

*Primary Examiner*—Gareth D. Shaw
*Assistant Examiner*—James D. Thomas
*Attorney, Agent, or Firm*—William S. Robertson

[57] ABSTRACT

In a circuit for addressing a data store with an address having a portion identifying a character location having several byte locations and a portion identifying one of the bytes within the addressed character location, means is provided for addressing a number of bytes per character that is not an integral power of 2. The two address portions are used conventionally for addressing a first part of the store in which the number of byte positions for each character is an integral power of 2. A second part of the store holds the next byte position for each character and is addressed by the combination of a set of fixed address bits and the character portion of the address used for addressing the first part of the store.

9 Claims, 4 Drawing Figures

STORAGE ACCESS APPARATUS

INTRODUCTION

It is convenient to think of a data storage device as having its storage locations arranged in a numbered sequence. In the operation of addressing a particular location, the number of the location is supplied to a component of the data store called an address decoder and the decoder and other circuits convert the address number into electrical signals for selecting the addressed location.

Addresses are conveniently expressed in binary numbers to correspond to the binary logic circuits that are used in the addressing circuits. For a given number of address bits, $n$, the number of store locations that can be addressed is 2 to the nth power. Thus, a 10 bit address is necessary to select one byte in a store having 1024 bytes. It is often desirable to divide a multi-bit address into 2 or more distinct portions. In an example that will be discussed later, a 10 bit address is divided into two parts, one of 3 bits and one of 7 bits. The 7 bit portion of the address presents the sequence 0000000 through 1111111 (decimal 0 through 127) and can address 128 groups of 8 bytes each. The 3 bit portion presents the sequence 000 through 111 (decimal 0 through 7) and can address the 8 bytes within one of the groups addressed by the 7 bit portion of the address.

In the example that will be described in detail later, the address is used for accessing a storage device to fetch several bytes of data that provide the information to generate one character in a display. In this example the 3 low order bits of the address can be thought of as defining a sequence of byte locations that hold one character and the high order bits can be thought of as defining a particular one of these sequences and thus as identifying the corresponding character. The display user generates only the high order address bits which identify a particular character, and circuits associated with the store generate the succession of low order addresses that permit fetching the sequence of bytes that make up the addressed character. The low order bits are conveniently generated by a counter that is incremented with each store access operation so as to advance the address for fetching the next byte.

Suppose that the store has 1024 bytes and that the display requires 8 bytes for each character. As a succession of bytes are fetched, the 3 low order bits of the address advance through the repeating sequence 000, 001, 010 . . . 111 to address the 8 bytes of each character. It is convenient to use addresses ending in 000 as the beginning of a character and to call such an address a "character boundary." Thus, the 7 high order bits define character boundaries in the store, and these 7 high order bits define boundaries for 128 characters in the store.

The example that has been described so far works out conveniently because the unit of 8 bytes that is defined by each group of high order bits exactly equals the number provided by the repeating sequence of 3 low order address bits. The example would similarly permit fetching characters of 2 or 4 bytes, or more generally any integral power of 2.

SUMMARY OF THE INVENTION

An object of this invention is to provide a simple apparatus and method for addressing characters having a number of bytes that is not an integral power of 2. To understand the problem, suppose that 9 bytes (numbered 0 through 8) are to be fetched for each character of a 1024 byte store. The 10 bit address could be separated into 4 low order address bits and 6 high order bits. These 6 high order bits would address only 64 characters and each character location would have 16 bytes but a character would use only 9 of the 16 bytes. By contrast, if the 1024 bytes were addressed sequentially without separating the high and low order bit positions, the store would permit addressing 113 character locations and leave only 7 bytes as an unused remainder. A more specific object of this invention is to provide a new and improved addressing circuit in which the address is separated into a high order and a low order portion and in which a high portion of the addressable locations are used.

According to this invention, the first 8 bytes of each character are stored on character boundaries in the conventional fashion already described. In the example, high order addresses 0000000 through 1101111 define a first part of the store and are used with the repeating sequence of 3 low order bits to address bytes 0 through 7 of each character. Addresses 1110000 through 1111111 define a second part of the store that holds a sequence of 112 bytes for byte position 8 of each character (plus 16 unused byte locations). Notice that there is one extra byte position (and one corresponding address) for each of the 112 8 byte groups and that the high order character addresses provide 112 consecutive addresses 0000000 through 1101111 (decimal 0 through 111).

According to this invention, an address for byte 8 is generated by assigning 111 to the 3 highest order positions of the modified address and by assigning the 7 high order bits of the character address to the 7 low order bits of the address. For example, the character address 0011011 (decimal 27) defines an 8 byte group for character 27, and the address 1110011011 defines byte position 27 in the storage section identified by the high order fixed address bits 111. The 7 low order bits of the second address are the 7 high order bits of the first address.

A more generalized summary of the invention will be presented after the description of the embodiments of the invention that are shown in the drawing.

THE DRAWING

THE SYSTEM OF THE DRAWING

INTRODUCTION

Figure 1:
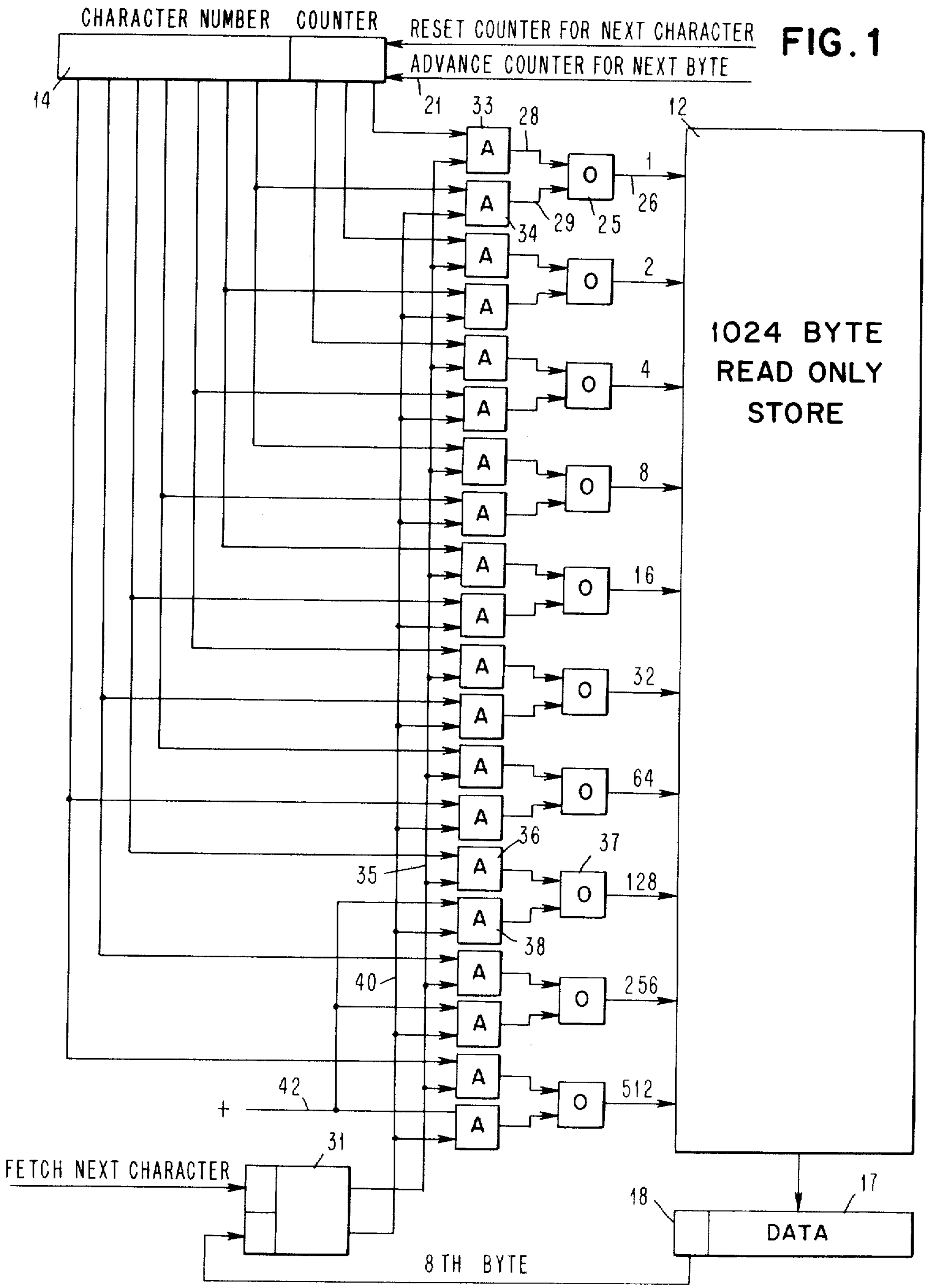
FIG. 1 is a schematic drawing of one embodiment of the addressing circuit of this invention.

FIG. 1 shows a read only store 12 that has 1024 bytes. A byte is the smallest multi-bit unit of data that is addressable in the store. To fetch a byte from store 12, a 10 bit address is loaded into an address register 14. The 10 bit positions of register 14 are applied through intervening logic to store 12. The 10 bit address can be thought of as a 10 bit binary number having decimal place values 1, 2, 4 . . . 512 proceeding from right to left. The drawing shows these numerals with the corresponding address input lines to store 12, and they will be used to identify positions in the register, and they provide a convenient means for converting a binary address to the corresponding decimal number by adding the numbers in the drawings for which the corresponding address bit is a 1. Store 12 includes an address decoder that responds to the 10 address bits to select the binary storage cells that make up the addressed byte. The addressed byte is loaded into a register 17 where it is available to the user of the store. Register 17 has a bit position 18 that is used by the circuit of this invention and it has other bit positions that hold data or control signals for the user of the store.

The 7 high order bits of the address register 14 are supplied by the user of store 12 and will be called a "character number." The three low order bit positions of register 14 form a counter section and are advanced independently of the character number in response to a signal on a line 21, Advance Counter For Next Byte, as each byte is fetched from the store. This signal can conveniently be generated by the circuits of the associated system that gate the output of register 17 to the user of the store.

THE GATING CIRCUIT OF FIG. 1

The gating circuit for address bit position 1 is representative of the gating for address bit positions 1 through 64 and the gating for address position 128 also represents the gating for postions 256 and 512. An OR circuit 25 produces the address bit for position 1 on a line 26 in response to either of two inputs 28 or 29. A latch 31 controls AND gates 33, 34 through a line 35 to transmit bit position 1 from register 14 through gates 33, 25 when latch 31 is set. Each other output of register 14 is similarly connected through an AND gate that is conditioned by the set output of latch 31 and through associated OR gate to store 12 in a direct correspondence between the position of a bit at register 14 and the position at the input to store 12. Thus, when latch 31 is set, the gating circuit connects register 14 to store 12 for conventional operation.

When latch 31 is reset in response to a 1 in bit position 18 during the operation of reading byte 7, it energizes a line 40 and enables AND gate 34 to transmit the low order bit of the character number section of register 14 to the low order position of the address input to store 12 for the next operation. Other AND gates similarly respond to the reset output of latch 31 to transmit each other bit position of the character number section of register 14 to successive address input positions of store 12. Thus, the counter section of register 14 is unused when latch 31 is reset.

An AND gate 36 and an OR gate 37 respond to the set output 35 of latch 31 to transmit the 128th place of register 14 to the corresponding position of store 12 in a way that has already been described. AND gate 38 has one input connected to the reset output 40 of latch 31 in the way described for AND gate 29 but its other input is connected to a positive voltage point 42 which represents a logical 1. Thus, the output of AND gate 38 is logically equivalent to the reset output of latch 31 and OR gate 37 produces a logical 1 at address input 128 of store 12. The circuits for the next two high order address inputs are similarly connected to produce an input from the corresponding position of register 14 when latch 31 is set and to produce a logical 1 when latch 31 is reset.

OPERATION

Figure 2:
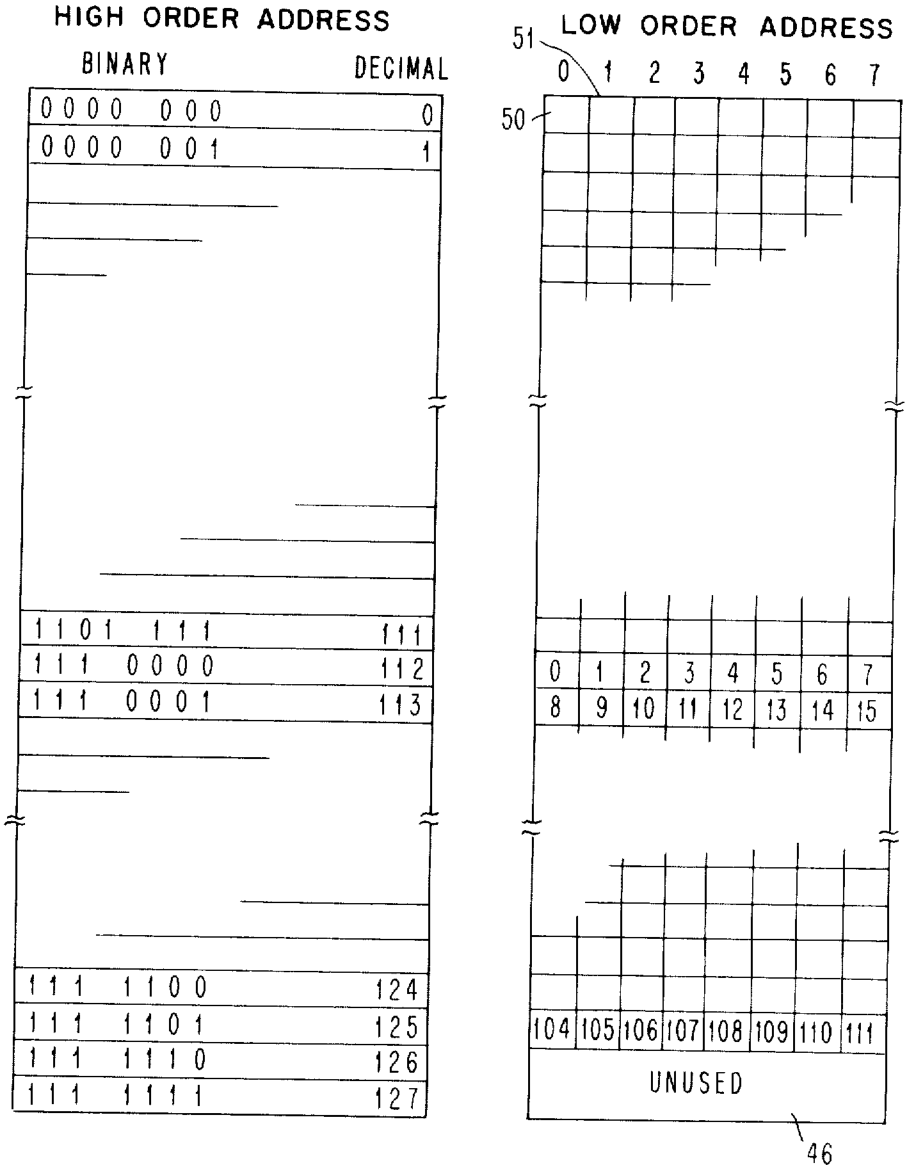
FIG. 2 shows the data organization of a store as an example of the operation of the circuit of FIG. 1.

FIG. 2 shows the byte positions of store 12 arranged in an array 46 that corresponds to the division of the address into a character section and a counter section. The 1024 bytes are respresented by blocks 50 and 51 and in the array of FIG. 2 there are eight columns numbered 0 through 7 and 128 rows numbered 0 through 127. The corresponding binary numbers of the character or row address are also shown. Thus, a particular byte defined by a 10 bit address is positioned in FIG. 2 at the intersection of the column defined by the counter section of register 14 and the row defined by the character number section of register 14.

Character locations 0 through 111 (decimal) hold 8 bytes of the correspondingly numbered character and for the operation of selecting these 8 bytes of a character, latch 31 is set and the circuit operates in the way already described for prior art stores in which the counter and character number section of the address are entirely independent. For example, when the character number section of register 14 has the seven bit binary number 0000000 and the counter is set to 000, the addressing circuits select a byte in store 12 that is represented by the block 50 in FIG. 2. For fetching the next byte, the counter is advanced to 001 and byte represented by block 51 in row 0 and column 1 is accessed. Similarly, each row, 0 through 111 contains the first 8 bytes (0 through 7) of the 112 characters (0 through 111) identified by the high order address bit.

Byte 8 for each of the characters is stored in a second part of store 12 at a sequence of addresses beginning at a predetermined location. The location is chosen so that there are as many byte locations in the second part of the store as there are character locations in the character section, and preferably the second part begins at a boundary defined by a unique sequence of high order address bits. In the example of the drawing, row address locations 1110000 through 1111111 are used for the extra byte locations. These high order address bits are conveniently provided at the three high order inputs to store 12 by the positive potential bytes divided by to gate 38 and the two corresponding gates for inputs 256 and 512 to store 12. These address locations are 1/8 of the capacity of store 12 and this ratio corresponds closely to the ratio that 1/9 of the data bytes are to be stored in the second part of the store. Since the number of bytes to be stored (1/9 of the total number of data bytes) is smaller than the storage capacity (1/8 of the total storage capacity), the conventionally addressed section of the store can be fully used and the locations that are unused (because 1024 bytes divided by 9 bytes per character does not divide evenly) will appear in the additional storage section.

Each byte position in the additional storage section corresponds to a particular character in the character section of the store. The characters can be identified by their seven bit character number in the binary sequence 0000000 through 1101111 (decimal 0 through decimal 111). Thus, within the additional storage section defined by the three high order bits 111, the seven bit character number defines a unique byte location. An example will help to explain this concept.

In the list of addresses, the binary address numbers are written with spaces that will help to show the realignment of the addresses for addressing the additional storage space. For the character identified by decimal 1, the binary address is written 0000 001. When latch 31 is reset for the byte 8, the three low order bits of this character address are shifted to address positions 1, 2, and 4 and thereby address an individual byte located in column 1 of the array of FIG. 2. The four high order bits of this character address form bit positions 8, 16, 32, and 64 and are combined with the three high order bits 111 to form the high order address 111 0000 (decimal 112). Thus, the 10 bit address can be represented as 111 (the fixed address input) 0000 (the four high order bits for character 1) 001 (the three low order character bits for character 1). In the array of FIG. 1 this byte is at the intersection of row 112 and column 1 and is identified by a decimal 1 which corresponds to the decimal number of this character.

It can be seen that characters 0 through 7 each have a 0 in position 32 of the address and that the address shifting circuit of FIG. 1 produces the same row address, 111 0000, for each of these characters. The three low order bits of the character address, 000 through 111, provide the sequence for stepping the address counter from column to column to select the one additional byte for characters 0 through 7. For characters 8 through 15 (0001 000 through 0001 111) the shift operation produces the seven high order address bits 111 0001 and the three low order bits of the character address are shifted to produce the sequence 000 through 111 for addressing columns 0 through 7 to select the additional bytes for characters 8 through 15.

At the end of the operation of addressing byte 8, the user of the store may fetch a next character by providing signals Fetch Next Character and Reset Counter For Next Character to set latch 31 and reset the counter portion of register 14.

To generalize the invention as it has been described so far, there are M bits in the character portion of the address and N bits in the counter portion for addressing a character of $2^N+1$ bytes. The M address bits of the character portion of the address register define a character boundary and the first $2^N$ bytes of each character are stored on character boundaries at address locations defined by the M address bits. The next byte for each character is stored at consecutive byte locations starting at address location 1 . . . 0 where the N high order address bits are 1's and the M low order address bits are 0's. Each of these byte locations is related to a specific character address by having as M low order bits the M bit character address of the associated character.

A simple example will help to illustrate this generalization. Suppose that a 1024 byte store is to hold 17 byte characters. Such an organization can be thought of as an array of 16 columns and 64 rows. The address counter has four bits (N equals 4) for addressing the 16 columns and the character portion of the address has 6 bits for addressing 60 rows (M equals 6). Byte positions 0 through 15 of each character are stored in the corresponding character location and byte 16 (the 17th byte) is stored in consecutive address locations beginning at 111100 (decimal 60). This example is a simple scaling of the values used in the example of the drawing and a variety of useful examples can be constructed from the generalized statement of the preceding paragraph.

THE EMBODIMENT OF FIGS. 3 AND 4

Figure 4:
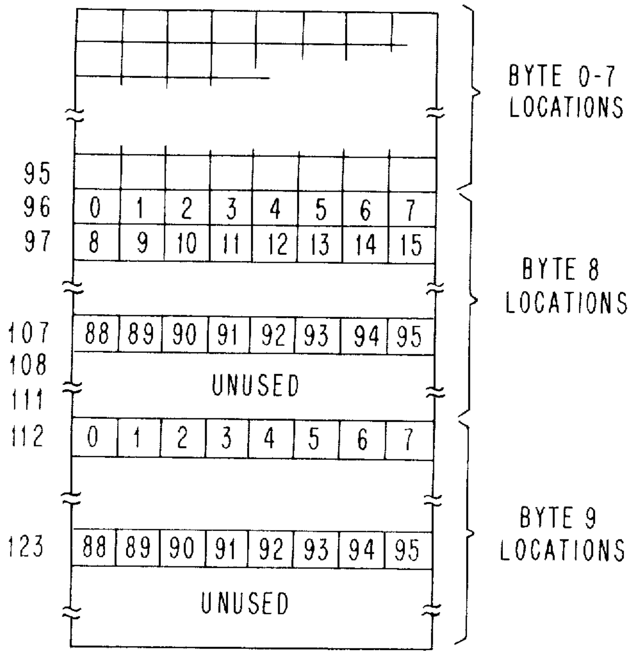
FIG. 4 shows the data organization of a store as an example of the operation of the circuit of FIG. 3.

The invention is also useful for characters having two (or more) bytes more than the next lower binary number of bytes. Suppose that the 1024 byte store is to be organized as characters of 10 bytes each as shown in FIG. 4. At least 2/10th's of the store must be allocated to the byte 8 and 9, 1/10th for the byte 8 locations and 1/10th for byte 9 locations. Since the next larger binary fraction is 1/8th, 3/4 of the store forms a first section for bytes 0–7 of a character, 1/8 forms a second section for byte 8 locations, and 1/8 forms a third section for byte 9 locations. In the array of FIG. 4, the three high order bit positions of the address divide the store into eights. Thus, character locations 000 0000 through 010 1111 are allocated to the first 8 bytes of characters 0 through 95 identified by numbers to the left of corresponding rows of array 60 in FIG. 4. A block of 128 byte locations beginning at character location 110 0000 (row 96) is allocated to byte 8 and a block of 128 byte locations beginning at character location 111 0000 (row 112) is allocated to byte 9.

From a more general standpoint, the N bits of the counter provides for $2^N$ bytes per character and each additional byte per character takes a part of the store equal to less than $1/2^N$.

Figure 3:
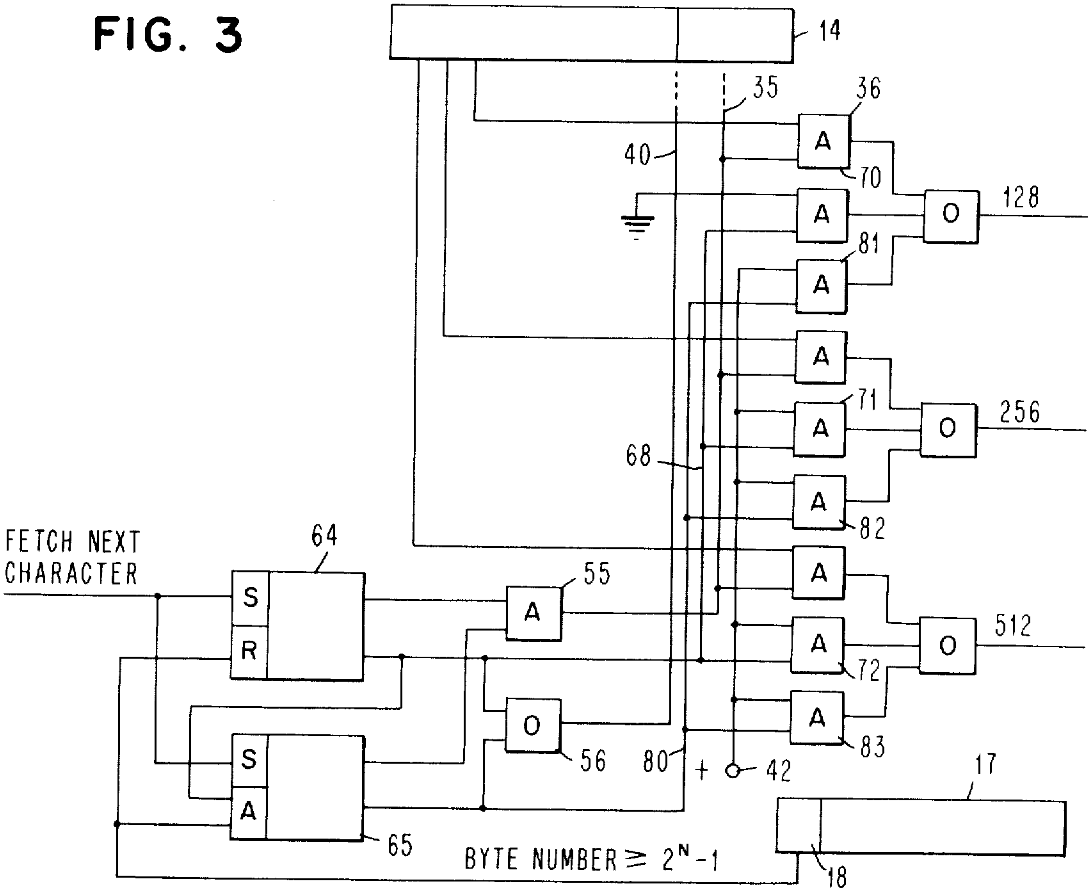
FIG. 3 is a schematic drawing of a second embodiment of the invention.

FIG. 3 shows some of the components already introduced in the description of FIG. 1 and components that are modified for this embodiment. To simplify the drawing, other components that are identical to the components of FIG. 1 are omitted. Two latches 64, 65 are connected to be set in response to the signal Fetch Next Character and cooperate with a gate 55 to energize line 35 (as in FIG. 1) for controlling gates such as AND gate 36 to connect corresponding positions of register 14 and store 12 for addressing the first part of store 12 when latches 64, 65 are set. Similarly, latches 64, 65 cooperate with a gate 56 to produce a 1 logic level signal on line 40 for shifting the character portion of the address when either latch is reset. Latches 64, 65 are connected as a counter to respond to bit position 18 of register 17 to advance in a counting sequence as bytes 8 and 9 are loaded into register 17.

When the first one bit appears in position 18 with byte 7, latch 64 is reset and energizes a line 68 which enables AND gates 70, 71, 72 to provide address signals to store 12 in the same general way already described for the circuit of FIG. 1 during the next storage cycle. Gate 70 has one input maintained at ground potential to represent a 0 logic level and it produces a corresponding 0 at address position 128 of store 12. Gates 71 and 72 have their remaining inputs connected to positive potential point 42 to produce a logical 1 at address inputs 256 and 512 of store 12 when latch 64 is reset.

When the second one bit appears in position 18 of register 17 during the operation of fetching byte 8, latch 65 is reset and produces a 1 logic level signal on line 80. Line 80 conditions AND gates 81, 82, and 83 to produce 1 logic levels at address inputs 128, 256 and 512 in the same way described for the circuit of FIG. 1 when latch 31 is reset.

It will be understood that the logic of FIGS. 1 and 3 are made redundant in various aspects to show the more general aspects of the invention, that the 4 bit counter of the drawing includes a decoding function that would be conventionally provided by additional gates for a higher count, and that the latch 31 is a 1 bit counter.

OTHER EMBODIMENTS

The two unused rows in the array of FIG. 2 can be used by supplying the address 1111110 (decimal 126) to register 14. The circuit accesses the 8 byte locations of row 126 and then shifts the character address to form the 10 bit address 111 1111110 to access additional byte location 6 in row 127. Similarly, in the array of FIG. 4, the character address 1101100 accesses the 8 bytes in unused row 108 and the character address is shifted to form the address 110 1101100 to access byte location 4 in row 111. The addresses for rows 109 and 110 are shifted to access additional byte locations 5 and 6 in row 111, and the addresses for rows 124, 125 and 126 are shifted to access byte locations 4, 5 and 6 in row 127.

The user may supply nonsequential addresses (e.g., skipping character addresses 112 through 125 in the example of FIG. 2), or means may be provided for transforming a set of sequential character addresses into the nonsequential set for addressing the otherwise unused part of the store.

In examples that have been discussed so far, the fixed address bits have been shifted to the high order position of the address register. In the example in which there are unused byte locations such as rows 126 and 127 in FIG. 2, this arrangement preserves the sequential order of the character addresses. From a more general standpoint, the fixed bit positions may be located at any place within the character defining a portion of the address. All addresses having the fixed pattern in these bit positions are reserved for the extra byte locations and the addressing is nonsequential. For example, the three lower bits of the character address may be shifted into the counter address position and the fixed address bits may be shifted to positions 8, 16 and 32 of store 12.

Since the number of fixed address bits equals the number of bits in the counter register, the counter can be set to the appropriate value and shifted to the position assigned to the fixed address bits. In examples that have been given so far, the address can be simply shifted three positions to the right with the counter portion being substituted for the three high order positions of the character portion of the address, or the three lower bits of the character portion of the address can be swapped with the counter portion.

In the examples that have been given so far, the number of bytes per character has been one or a few larger than the next lower integral power of two. Suppose on the other hand that in the 1024 byte store a character is to have 7 bytes. By the conventional addressing that has been described earlier, the 7 byte locations within each 8 byte character boundary would form a 7 byte character and one byte would be unused. If the store is organized as FIG. 4, it has an array of four columns and 256 rows, rows 0–127 form the first part of the store, rows 160–191, 192–223 and 224–255 form parts 2, 3 and 4, and rows 128–159 are unused. The otherwise unused rows can be addressed to provide 16 more characters with rows 144–147 unused. Notice that the number of fixed address bits is three in this example (101, 110, 111) although there are only 2 bits in the counter portion of the address register. In small stores there may not be enough unused byte locations to permit the additional nonsequential addressing but this feature is useful in many applications.

The invention has been described in a relation to a store that fetches one byte at a time and in which the counter portion of the address register is used for generating the byte addresses. The invention is useful with storage systems of the type that produce a multi-byte memory word in response to the character address and permit addressing individual bytes from the counter address. In such an arrangement, the counter address would not be used for accessing the first part of the store and a counter address would be generated entirely from the character address for addressing individual bytes within the second part of the store.

Many other useful applications and modifications of this invention will be apparent to those skilled in the art within the spirit of the invention and the scope of the claims.

What is claimed is:

1. Apparatus for addressing a storage system to access a multi-byte character having a number of bytes that is not an integral power of 2, comprising, means providing a character address having a number of bit positions designated M and being restricted in range to a first part of said storage system such that M–N predetermined ones of said bit positions hold a unique entry for each character address in said range, where N designates a number of bit positions in the address and is less than M, means providing N predetermined bits defining a second part of said storage system, and means responsive to said M bit character address to address a multi-byte location in said first part of said store and responsive to said N predetermined bits and to said M bits for addressing an additional byte location in said second part of said storage system for each character address.

2. The addressing apparatus of claim 1 wherein said storage system comprises a store having common addressing components for said first part and said second part, whereby accessing said first and second parts is a sequential operation, and wherein said apparatus includes means responsive to a signal identifying the completion of the operation of accessing said first part to respond to said N predetermined address bits and said M address bits to address said additional byte locations.

3. The apparatus of claim 1 including means providing an additional N predetermined bits defining a third part of said store, and means responsive to said M address bits and to said additioial predetermined bits to address a second additional byte location in said store.

4. The apparatus of claim 1 wherein said number of bytes per character is larger than $2^N$ and each multi-byte location in said first part of said storage system holds $2^N$ bytes, and wherein said apparatus further includes, means for shifting N of said character address bits from the position of said N predetermined bits and shifting N of character address bits into a position to address a byte within the multi-byte location defined by said predetermined bits and M–N of said character address bits.

5. The apparatus of claim 4 comprising means for shifting said M address bits N positions to form N bits for addressing an additional byte location within a group of $2^N$ bytes and to form M–N bits for addressing said group of $2^N$ bytes within said second part of said store.

6. The apparatus of claim 5 further including means providing a limited number of character addresses in the range of otherwise unused portions of said second part of said store.

7. The apparatus of claim 4 including means providing an address of N bits defining a byte to be addressed in a multi-byte location in the first part of said store and means for shifting said M bits for addressing with said N predetermined bits one byte.

8. The apparatus of claim 7 wherein said store accesses one byte at a time and said apparatus includes latch means connected to be set to one state for addressing a multi-byte location in said first part of said store and to be set to a different state in response to a predetermined bit in a byte read from said store, and means responsive to said different state of said latch means for operating said means for shifting for addressing an additional byte location.

9. The apparatus of claim 8 including means providing an additional N predetermined bits defining a third part of said store, and wherein said latch means includes a first latch connected to be set to a second state by an operation to read the last byte of a multi-byte location and a second latch connected to be set to a second state in response to an operation to read an additional byte in said second part of said store.

* * * * *